US011011944B2

(12) United States Patent
Niizuma

(10) Patent No.: US 11,011,944 B2
(45) Date of Patent: May 18, 2021

(54) FOREIGN MATTER DETECTION DEVICE FOR NON-CONTACT POWER SUPPLY SYSTEM

(71) Applicant: IHI Corporation, Tokyo (JP)

(72) Inventor: Motonao Niizuma, Tokyo (JP)

(73) Assignee: IHI Corporation, Toyko (JP)

(*) Notice: Subject to any disclaimer, the term of this patent is extended or adjusted under 35 U.S.C. 154(b) by 17 days.

(21) Appl. No.: 16/340,397

(22) PCT Filed: Feb. 13, 2018

(86) PCT No.: PCT/JP2018/004885
§ 371 (c)(1),
(2) Date: Apr. 9, 2019

(87) PCT Pub. No.: WO2018/151096
PCT Pub. Date: Aug. 23, 2018

(65) Prior Publication Data
US 2019/0273402 A1    Sep. 5, 2019

(30) Foreign Application Priority Data

Feb. 14, 2017 (JP) .............................. JP2017-025007

(51) Int. Cl.
| | | |
|---|---|---|
| *H02J 50/60* | (2016.01) | |
| *H02J 50/10* | (2016.01) | |
| *B60L 53/12* | (2019.01) | |
| *H02J 7/02* | (2016.01) | |
| *H02J 50/12* | (2016.01) | |
| *H02J 50/90* | (2016.01) | |
| *H02J 50/80* | (2016.01) | |

(52) U.S. Cl.
CPC .............. *H02J 50/60* (2016.02); *B60L 53/12* (2019.02); *H02J 7/025* (2013.01); *H02J 50/10* (2016.02);
(Continued)

(58) Field of Classification Search
CPC ........ B60L 11/00; B60L 11/182; B60L 53/00; B60L 53/12; B60L 53/124; H01F 38/00;
(Continued)

(56) References Cited

U.S. PATENT DOCUMENTS

2014/0339905 A1    11/2014    Moritsuka et al.
2015/0372498 A1    12/2015    Ichikawa et al.
(Continued)

FOREIGN PATENT DOCUMENTS

| EP | 3050738 A1 | 8/2016 |
|---|---|---|
| JP | 07-236204 A | 9/1995 |

(Continued)

OTHER PUBLICATIONS

International Search Report dated Mar. 13, 2018 for PCT Application No. PCT/JP2018/004885.

*Primary Examiner* — Lincoln D Donovan
*Assistant Examiner* — Dave Mattison
(74) *Attorney, Agent, or Firm* — Volpe Koenig

(57) ABSTRACT

A foreign object detection device for a wireless power transfer system includes a storage unit that stores first coil device information including a shape and a size of a first coil facing surface, a height position from the reference surface, and a height position of a first device facing surface; an information acquiring unit that acquires second coil device information including a shape, a size, and a height position of a second coil facing surface, and a height position of a second device facing surface; a region identifying unit that identifies a magnetic field generation region generated between the first device facing surface and the second device facing surface during power feeding, based on the first coil device information and the second coil device information;
(Continued)

and a foreign object detection unit that detects the presence or absence of a foreign object within the identified magnetic field generation region.

4 Claims, 9 Drawing Sheets

(52) U.S. Cl.
CPC .............. H02J 50/12 (2016.02); H02J 50/80 (2016.02); H02J 50/90 (2016.02)

(58) Field of Classification Search
CPC ... H01F 38/14; H02J 17/00; H02J 5/00; H02J 5/005; H02J 50/00; H02J 50/10; H02J 50/12; H02J 50/60; H02J 50/80; H02J 50/90; H02J 7/00; H02J 7/00034; H02J 7/025
USPC .......................................................... 307/104
See application file for complete search history.

(56) References Cited

U.S. PATENT DOCUMENTS

| | | | |
|---|---|---|---|
| 2016/0248271 A1 | 8/2016 | Amari | |
| 2016/0257209 A1 | 9/2016 | Lewis | |
| 2016/0282500 A1* | 9/2016 | Filippenko | G01V 3/104 |
| 2017/0040848 A1* | 2/2017 | Lannoije | B60L 53/126 |

FOREIGN PATENT DOCUMENTS

| | | |
|---|---|---|
| JP | 2007-267578 A | 10/2007 |
| JP | 2011-217460 A | 10/2011 |
| JP | 2012-196015 A | 10/2012 |
| JP | 2012-257404 A | 12/2012 |
| JP | 2013-027116 A | 2/2013 |
| JP | 2013-046492 A | 3/2013 |
| JP | 2013-176286 A | 9/2013 |
| JP | 2013-223397 A | 10/2013 |
| JP | 2013-242168 A | 12/2013 |
| JP | 2013-252039 A | 12/2013 |
| JP | 2014-090601 A | 5/2014 |
| JP | 2014-107915 A | 6/2014 |
| JP | 2014-113018 A | 6/2014 |
| JP | 2014-121126 A | 6/2014 |
| JP | 2014-150628 A | 8/2014 |
| JP | 2014-158315 A | 8/2014 |
| JP | 2014-207749 A | 10/2014 |
| JP | 2014-230299 A | 12/2014 |
| JP | 2015-008552 A | 1/2015 |
| JP | 2015-057020 A | 3/2015 |
| JP | 2015-095960 A | 5/2015 |
| JP | 2015-220934 A | 12/2015 |
| JP | 2016-158410 A | 9/2016 |
| JP | 2016-167973 A | 9/2016 |
| WO | 2015/121934 A1 | 8/2015 |

* cited by examiner (a)

(b)

(a)

(b)

(a)

(b)

(a)

(b)

(a)

(b)

FOREIGN MATTER DETECTION DEVICE FOR NON-CONTACT POWER SUPPLY SYSTEM

TECHNICAL FIELD

The present disclosure relates to a foreign object detection device for a wireless power transfer system.

BACKGROUND ART

For example, there are wireless power transfer systems wirelessly feeding power between a coil device mounted in a vehicle and a coil device installed on the ground. For example, Patent Literature 1 discloses such a system.

In the system disclosed in Patent Literature 1, a foreign object between a coil device mounted in a vehicle and a coil device installed on the ground is detected by detecting light emitted on a power feeding surface of the coil device mounted in the vehicle.

CITATION LIST

Patent Literature

Patent Literature 1: Japanese Unexamined Patent Publication No. 2013-176286

SUMMARY OF INVENTION

Technical Problem

For example, in movable objects such as vehicles, the shape, the size, and the attachment height position of a coil provided in a coil device mounted in a movable object may vary according to the movable object (according to the type of the movable object). In this case, the shape of a magnetic field generation region generated between coil devices during power feeding may also vary, so that a foreign object outside the magnetic field generation region may be detected. Since wireless power transfer is performed via a magnetic field within the magnetic field generation region, a foreign object within the magnetic field generation region affects the magnetic field and hinders wireless power transfer. However, a foreign object outside the magnetic field generation region does not hinder wireless power transfer, so that wireless power transfer can be performed normally even if a foreign object is present outside the magnetic field generation region. That is, when a foreign object is present within the magnetic field generation region, there is a need to take countermeasures, such as stopping wireless power transfer. On the other hand, when a foreign object is present outside the magnetic field generation region, wireless power transfer can be performed normally. However, in detecting a foreign object, when the inside of the magnetic field generation region and the outside of the magnetic field generation region are not distinguished between, even when a foreign object outside the magnetic field generation region is detected, there is a need to take countermeasures, such as stopping wireless power transfer. Thus, a likelihood that wireless power transfer will be stopped increases, which is inconvenient.

The present disclosure describes a foreign object detection device for a wireless power transfer system in which detection of a foreign object, of foreign objects between coil devices, not hindering wireless power transfer is prevented as far as possible, and a likelihood that wireless power transfer will be stopped can be reduced.

Solution to Problem

According to an aspect of the present disclosure, there is provided a foreign object detection device for a wireless power transfer system wirelessly feeding power between a first coil device which has a first coil and is installed on a reference surface and a second coil device which has a second coil and is mounted in a movable object. The foreign object detection device includes a storage unit that stores first coil device information including a shape of a first coil facing surface in the first coil facing the second coil device, a size of the first coil facing surface, a height position of the first coil facing surface from the reference surface, and a height position of a first device facing surface in the first coil device facing the second coil device from the reference surface; an information acquiring unit that acquires second coil device information including a shape of a second coil facing surface in the second coil facing the first coil device, a size of the second coil facing surface, a height position of the second coil facing surface from the reference surface, and a height position of a second device facing surface in the second coil device facing the first coil device from the reference surface; a region identifying unit that identifies a magnetic field generation region generated between the first device facing surface and the second device facing surface when feeding power, based on the first coil device information and the second coil device information; and a foreign object detection unit that detects the presence or absence of a foreign object within the identified magnetic field generation region.

Effects of Invention

According to the aspect of the present disclosure, detection of a foreign object, of foreign objects between coil devices, not hindering wireless power transfer is prevented as far as possible, and a likelihood that wireless power transfer will be stopped can be reduced.

DESCRIPTION OF EMBODIMENT

Figure 1:
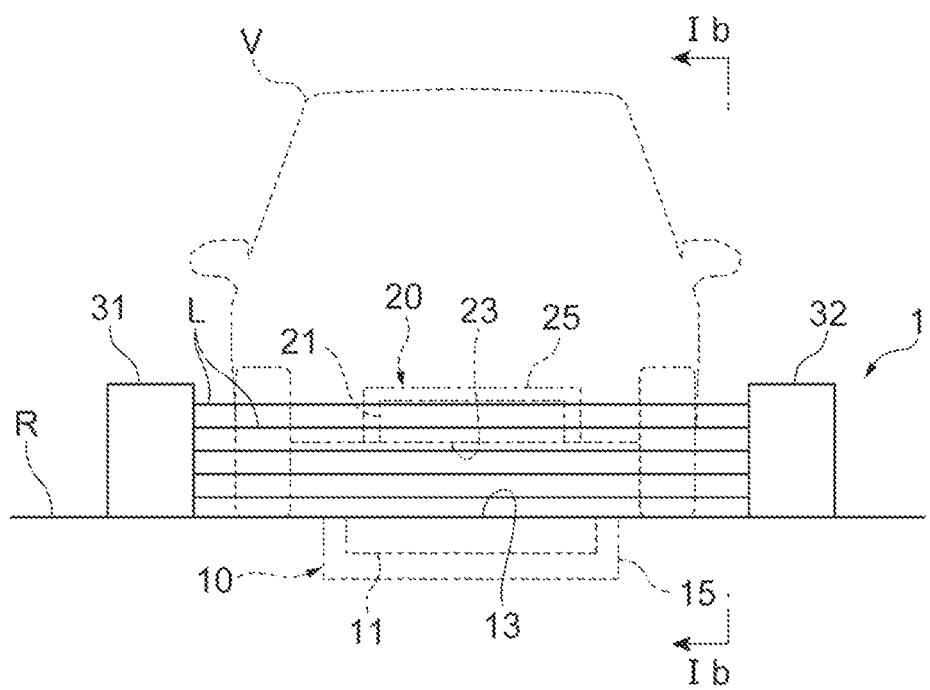
FIG. 1(a) is a view illustrating a schematic configuration of a power transmitter and a foreign object detection device of a wireless power transfer system according to an embodiment as viewed from in front of a vehicle.
FIG. 1(b) is a view illustrating a schematic configuration of the power transmitter and the foreign object detection device of the wireless power transfer system in FIG. 1(a) viewed from a side of the vehicle (schematic configuration of a cross section Ib-Ib when a light projecting unit is viewed from a light receiving unit).
Figure 1:
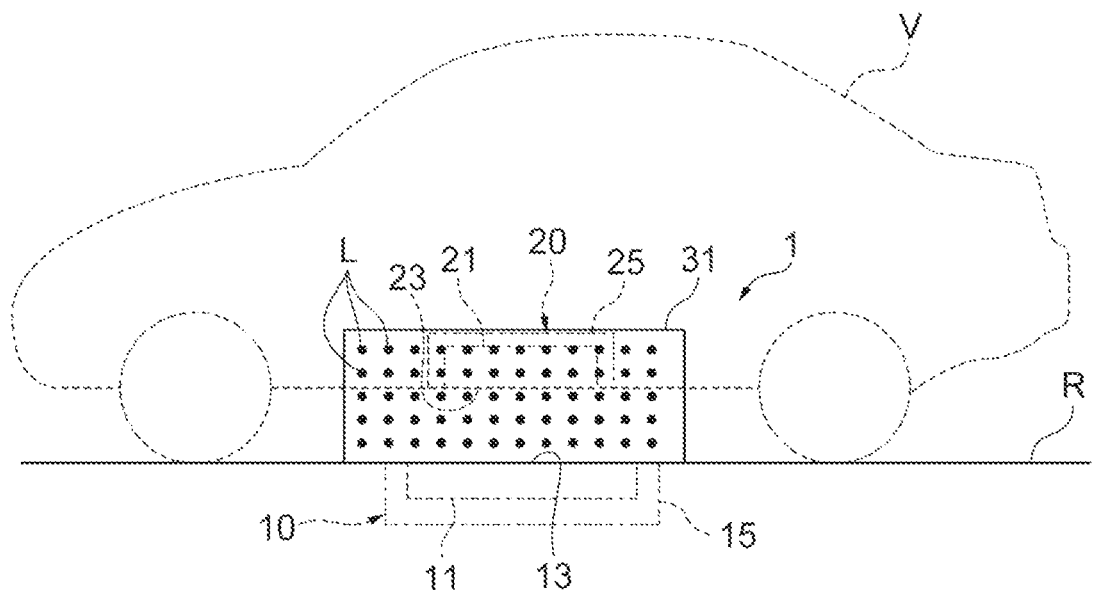

According to an aspect of the present disclosure, there is provided a foreign object detection device for a wireless power transfer system wirelessly feeding power between a first coil device which has a first coil and is installed on a reference surface and a second coil device which has a second coil and is mounted in a movable object. The foreign object detection device includes a storage unit that stores first coil device information including a shape of a first coil facing surface in the first coil facing the second coil device, a size of the first coil facing surface, a height position of the first coil facing surface from the reference surface, and a height position of a first device facing surface in the first coil device facing the second coil device from the reference surface; an information acquiring unit that acquires second coil device information including a shape of a second coil facing surface in the second coil facing the first coil device, a size of the second coil facing surface, a height position of the second coil facing surface from the reference surface, and a height position of a second device facing surface in the second coil device facing the first coil device from the reference surface; a region identifying unit that identifies a magnetic field generation region generated between the first device facing surface and the second device facing surface when feeding power, based on the first coil device information and the second coil device information; and a foreign object detection unit that detects the presence or absence of a foreign object within the identified magnetic field generation region.

In this foreign object detection device for a wireless power transfer system, the magnetic field generation region is identified based on the first coil device information and the second coil device information. In the foreign object detection device, the foreign object detection unit detects the presence or absence of a foreign object within the magnetic field generation region. Accordingly, even if the shape or the like of the second coil facing surface varies according to a movable object, the magnetic field generation region can be correctly identified in accordance with the movable object. Accordingly, in the foreign object detection device, detection of a foreign object, of foreign objects between the first coil device and the second coil device, not hindering wireless power transfer is prevented as far as possible, and a likelihood that wireless power transfer will be stopped can be reduced.

The region identifying unit may identify, as the magnetic field generation region, a region between the first device facing surface and the second device facing surface in a coil-to-coil region having a pillar shape or a frustum shape formed between the first coil facing surface and the second coil facing surface. In this case, the foreign object detection device can easily identify, as the magnetic field generation region, a region significantly affecting power feeding when a foreign object is present.

The region identifying unit may identify, as the magnetic field generation region, a region between the height position of the first device facing surface and the height position of the second device facing surface in an extended coil-to-coil region having a pillar shape or a frustum shape formed between a first extended coil facing surface which is realized by extending an outer peripheral edge of the first coil facing surface outward over a whole periphery by a predetermined extension length and a second extended coil facing surface which is realized by extending an outer peripheral edge of the second coil facing surface outward over a whole periphery by the extension length. The extension length may be a length equivalent to or smaller than a gap between the first coil facing surface and the second coil facing surface in a facing direction. In this case, even when a part in which a magnetic field is generated between the first coil and the second coil swells outward, the foreign object detection device can easily identify, as the magnetic field generation region, a region including the part which swells outward and in which a magnetic field is generated.

The foreign object detection device for a wireless power transfer system may further include a position detection unit that detects a position of the movable object in a first direction orthogonal to a facing direction of the first coil device and the second coil device. The region identifying unit may identify the magnetic field generation region based on the first coil device information, the second coil device information, and a position of the movable object detected by the position detection unit. In this case, for example, even if positions of the first coil device and the movable object are misaligned from positions set in advance, the foreign object detection device can accurately identify the magnetic field generation region in consideration of this misalignment as well.

Hereinafter, an embodiment of the present disclosure will be described with reference to the drawings. In description of the drawings, the same reference signs are applied to the same elements, and duplicated description will be omitted.

Figure 2:
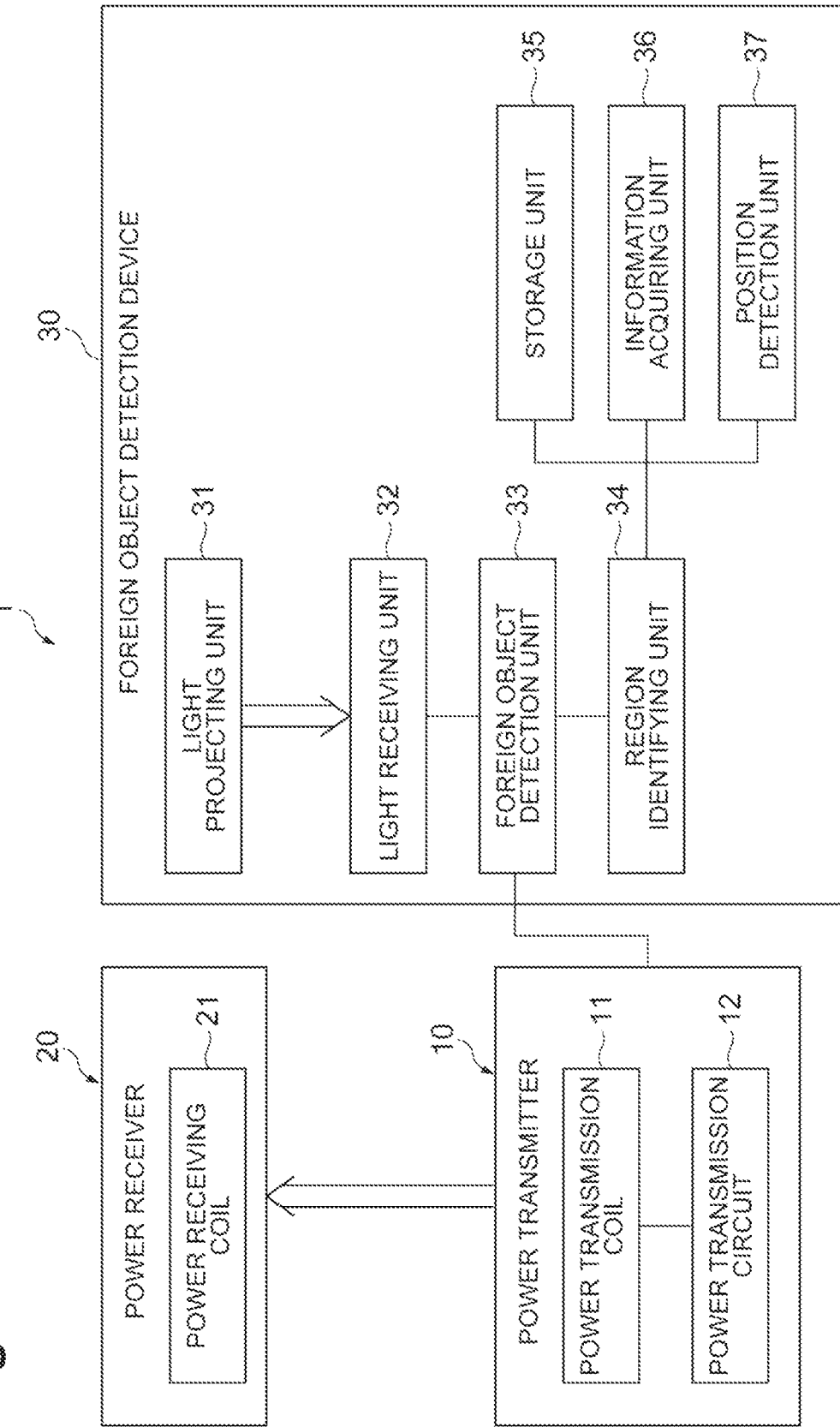
FIG. 2 is a block diagram illustrating an overall configuration of the wireless power transfer system in FIG. 1.

As illustrated in FIGS. 1 and 2, a wireless power transfer system 1 includes a power transmitter (first coil device) 10, a power receiver (second coil device) 20, and a foreign object detection device 30. The wireless power transfer system 1 is a system for wirelessly feeding power from the power transmitter 10 to the power receiver 20. For example, the power transmitter 10 is installed on a traveling road surface (reference surface, that is, ground) R of a parking lot or the like. For example, the power receiver 20 is mounted in a vehicle (movable object) V which is an electric automobile. The foreign object detection device 30 is provided on the ground. The wireless power transfer system 1 is configured to supply electric power by utilizing magnetic coupling between coils of a magnetic field resonance type, an electromagnetic induction type, or the like with respect to the vehicle V arriving at a parking lot or the like. The wireless power transfer type is not limited to that utilizing magnetic coupling and may be of an electric field resonance type, for example.

The power transmitter 10 is a device supplying electric power to the power receiver 20 through wireless power transfer. The power transmitter 10 includes a power transmission coil (first coil) 11, a power transmission circuit 12, and a cover 15. The power transmission circuit 12 is accommodated inside the cover 15. As illustrated in FIGS. 1(a) and 1(b), the power transmission coil 11 is accommodated inside the cover 15 such that an upper surface 13 of the power transmission coil 11 is exposed to the upper surface of the cover 15. The power transmitter 10 is embedded inside a recessed portion provided on the traveling road surface R such that the upper surface is exposed. That is, the upper surface 13 of the power transmission coil 11 is exposed to the traveling road surface R.

In this manner, the upper surface 13 of the power transmission coil 11 is a surface in the power transmission coil 11 (first coil facing surface) facing the power receiver 20. In addition, the upper surface 13 of the power transmission coil 11 is a surface in the power transmitter 10 (first device facing surface) facing the power receiver 20.

The power transmission circuit 12 generates high-frequency AC power suitable for wireless power transfer from electric power supplied from a power source (not illustrated) or the like. The power transmission circuit 12 supplies AC power to the power transmission coil 11 in a state in which the vehicle V has stopped within a power feedable region. Here, the power feedable region is a range of a stop position of the vehicle V when power feeding is performed between the power transmitter 10 and the power receiver 20. The power feedable region is set in advance. The power feedable region is set in advance based on power feeding efficiency, for example, as a region in which the power feeding efficiency is a predetermined value or higher. The power transmission coil 11 generates a magnetic field due to AC power supplied from the power transmission circuit 12. This magnetic field is an AC magnetic field which changes in a sinusoidal shape over time.

The power receiver 20 is a device wirelessly receiving electric power from the power transmitter 10. The power receiver 20 includes a power receiving coil (second coil) 21 and a cover 25. As illustrated in FIGS. 1(a) and 1(b), the power receiving coil 21 is accommodated inside the cover 25 such that a lower surface 23 of the power receiving coil 21 is exposed to a lower surface of the cover 25. The power receiver 20 is attached to a bottom surface of a vehicle body (chassis or the like) of the vehicle V between front wheels and rear wheels of the vehicle V such that the lower surface is exposed. That is, when the vehicle V is viewed from the traveling road surface R side, the lower surface 23 of the power receiving coil 21 is exposed.

In this manner, the lower surface 23 of the power receiving coil 21 is a surface in the power receiving coil 21 (second coil facing surface) facing the power transmitter 10. In addition, the lower surface 23 of the power receiving coil 21 is a surface in the power receiver 20 (second device facing surface) facing the power transmitter 10.

The power receiving coil 21 receives electric power from the power transmitter 10. Specifically, when the power receiving coil 21 is present in an AC magnetic field generated by the power transmission coil 11, the power receiving coil 21 generates an induced current. Accordingly, the power receiving coil 21 wirelessly receives AC power from the power transmission coil 11. Electric power received by the power receiving coil 21 is utilized for charging a battery of the vehicle V via a rectifier circuit, a charging circuit, and the like.

The foreign object detection device 30 is a device detecting a foreign object between the power transmitter 10 and the power receiver 20. Specifically, the foreign object detection device 30 includes a light projecting unit 31, a light receiving unit 32, a foreign object detection unit 33, a region identifying unit 34, a storage unit 35, an information acquiring unit 36, and a position detection unit 37. For example, the foreign object detection unit 33, the region identifying unit 34, the storage unit 35, the information acquiring unit 36, and the position detection unit 37 are constituted of an electronic control unit (ECU) including a central processing unit (CPU), a read only memory (ROM), and a random access memory (RAM).

The light projecting unit 31 emits a plurality of light beams L such that a region between the power receiver 20 of the vehicle V, which stops in the power feedable region, and the power transmitter 10 is included. The region between the power receiver 20 of the vehicle V, which stops in the power feedable region, and the power transmitter 10 varies according to the vehicle V, for example, the attachment height of the power receiver 20 varies according to the vehicle V (according to the type of the vehicle V). Therefore, the light projecting unit 31 emits the light beams L such that the region between the power receivers 20, which are mounted in all of the vehicles V (power feeding targets of the wireless power transfer system 1), and the power transmitter 10 is included. The light projecting unit 31 emits the light beams L immediately before starting power feeding and while performing power feeding between the power transmitter 10 and the power receiver 20.

The light receiving unit 32 detects a plurality of light beams L emitted from the light projecting unit 31. The light receiving unit 32 detects the plurality of emitted light beams L such that the detected light beam L can be distinguished. For example, a light detection sensor such as a photodiode is provided for each of positions where the light beams L can be received.

The storage unit 35 stores power transmitter information (first coil device information) including the shape of the upper surface 13 of the power transmission coil 11, the size of the upper surface 13, the height position of the upper surface 13 from the traveling road surface R, and the height position of a surface in the power transmitter 10 facing the power receiver 20 from the traveling road surface R. In the present embodiment, a surface in the power transmitter 10 facing the power receiver 20 is the upper surface 13 of the power transmission coil 11. Therefore, in the present embodiment, the storage unit 35 stores the power transmitter information including the shape of the upper surface 13 of the power transmission coil 11, the size of the upper surface 13, and the height position of the upper surface 13 from the traveling road surface R. The shape of the upper surface 13 of the power transmission coil 11, the size of the upper surface 13, and the height position of the upper surface 13 from the traveling road surface R are set in advance by a designer or the like of the wireless power transfer system 1. In the present embodiment, the height position of the upper surface 13 and the height position of the traveling road surface R coincide with each other.

The information acquiring unit 36 acquires power receiver information (second coil device information) including the shape of the lower surface 23 of the power receiving coil 21, the size of the lower surface 23, the height position of the lower surface 23 from the traveling road surface R, and the height position of a surface in the power receiver 20 facing the power transmitter 10 from the traveling road surface R. In the present embodiment, a surface in the power receiver 20 facing the power transmitter 10 is the lower surface 23 of the power receiving coil 21. Therefore, in the present embodiment, the information acquiring unit 36 acquires the power receiver information including the shape of the lower surface 23 of the power receiving coil 21, the size of the lower surface 23, and the height position of the lower surface 23 from the traveling road surface R.

Here, the information acquiring unit 36 may directly acquire the power receiver information from the vehicle V via a communication device. For example, the information acquiring unit 36 may acquire distinguishing information of the vehicle V and may acquire the power receiver information corresponding to the vehicle V based on the distinguishing information from a server or the like in which the power receiver information and the distinguishing information are stored in an associated manner for each vehicle V. In this case, the information acquiring unit 36 may acquire the distinguishing information from the vehicle V via the communication device and may acquire the distinguishing information by reading the license plate or the like of the vehicle V. In addition, the information acquiring unit 36 is not limited to acquiring the power receiver information from a server or the like and may store the power receiver information and the distinguishing information in an associated manner for each vehicle V.

The position detection unit 37 detects the position of the vehicle V in the horizontal direction (first direction) orthogonal to the facing direction (up-down direction) of the power transmitter 10 and the power receiver 20. The position detection unit 37 detects the position of the vehicle V which has stopped for power feeding. For example, the position detection unit 37 may acquire the position of the vehicle V positioned by a GPS receiver mounted in the vehicle V. For example, the position detection unit 37 may detect the position of the vehicle V by using sensors of various kinds or the like, for example, using a magnetic field generated for position detection different from a magnetic field for wireless power transfer.

The region identifying unit 34 identifies (estimates) a magnetic field generation region X generated between the upper surface 13 of the power transmission coil 11 and the lower surface 23 of the power receiving coil 21 during power feeding, based on the power transmitter information stored in the storage unit 35 and the power receiver information acquired by the information acquiring unit 36. The region identifying unit 34 three-dimensionally identifies the shape, the size, and the position of the magnetic field generation region X. For example, the magnetic field generation region X can be a region in which the intensity of a magnetic field has a predetermined threshold value or higher. Since a magnetic field is an AC magnetic field, the intensity of a magnetic field denotes an effective value, for example. The region identifying unit 34 can identify the magnetic field generation region X by performing a known simulation in consideration of the power transmitter information, the power receiver information, and the characteristics or the like of the power transmission coil 11 and the power receiving coil 21.

In addition, the region identifying unit 34 may identify the magnetic field generation region X by performing approximation or the like thereof. The region identifying unit 34 can three-dimensionally grasp a positional relationship between the upper surface 13 of the power transmission coil 11 and the lower surface 23 of the power receiving coil 21 based on the power transmitter information and the power receiver information. More specifically, the region identifying unit 34 can three-dimensionally grasp the position of the lower surface 23 of the power receiving coil 21 with respect to the upper surface 13 of the power transmission coil 11 based on the position of the vehicle V detected by the position detection unit 37, the power transmitter information, and the power receiver information.

The region identifying unit 34 does not have to use the position of the vehicle V detected by the position detection unit 37. In this case, on the assumption that the vehicle V has stopped at a power feeding position set in advance within the power feedable region, the region identifying unit 34 can three-dimensionally grasp the position of the lower surface 23 of the power receiving coil 21 with respect to the upper surface 13 of the power transmission coil 11 based on the power transmitter information and the power receiver information. For example, the power feeding position set in advance may be a position of the vehicle V at which the power feeding efficiency is maximized within the power feedable region, or a position at which the center position of the power transmission coil 11 in the horizontal direction and the center position of the power receiving coil 21 in the horizontal direction coincide with each other in the up-down direction. Regarding a technique of three-dimensionally grasping the position of the lower surface 23 of the power receiving coil 21 with respect to the upper surface 13 of the power transmission coil 11, a known method can be used. In this case, the position detection unit 37 may be omitted.

Figure 3:
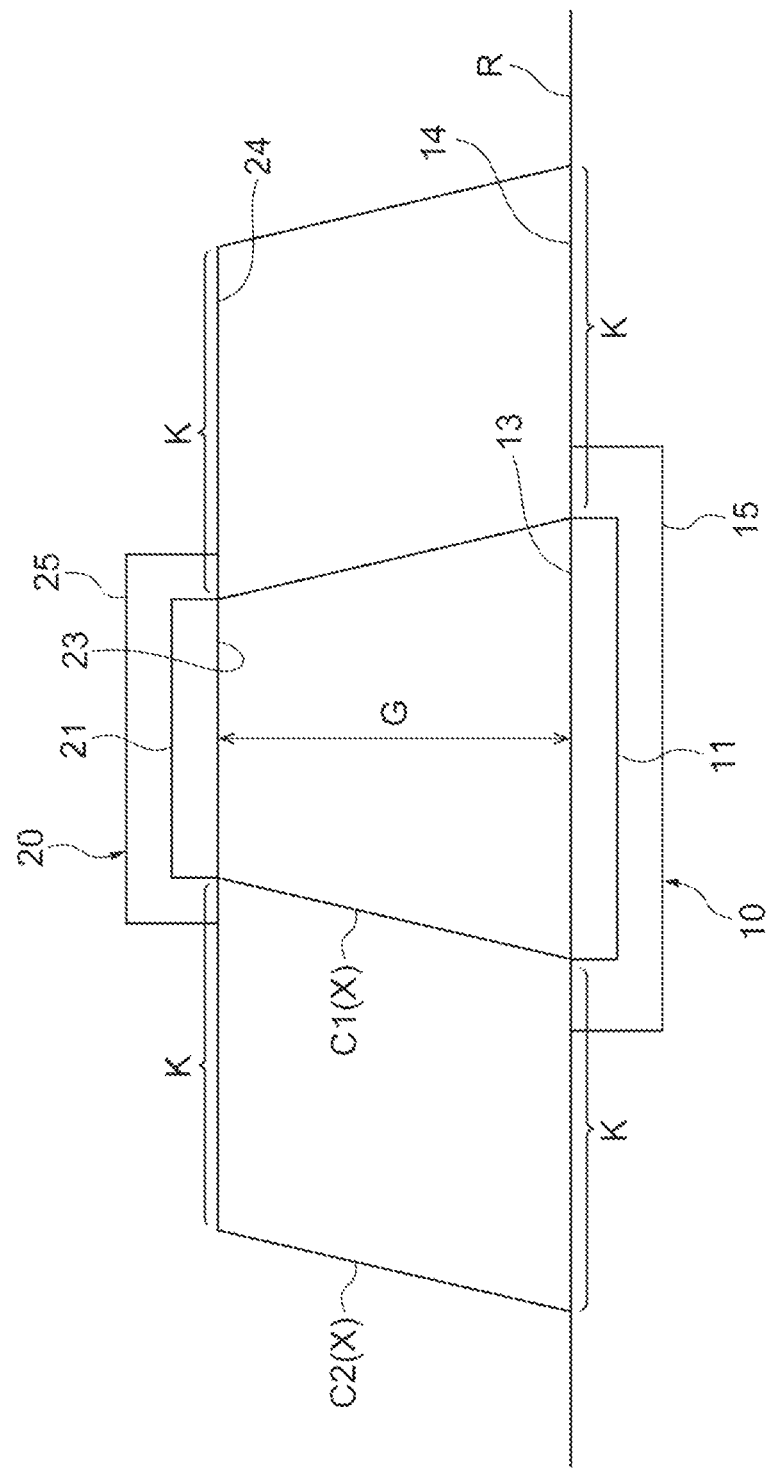
FIG. 3 is a schematic view for describing a magnetic field generation region which is a target for detecting the presence or absence of a foreign object.

As illustrated in FIG. 3, the region identifying unit 34 three-dimensionally calculates a coil-to-coil region C1 having a pillar shape or a frustum shape formed between the upper surface 13 of the power transmission coil 11 and the lower surface 23 of the power receiving coil 21, based on the three-dimensionally grasped positions of the upper surface 13 of the power transmission coil 11 and the lower surface 23 of the power receiving coil 21. The coil-to-coil region C1 having a pillar shape or a frustum shape is a space formed by linearly connecting the outer peripheral edge of the upper surface 13 of the power transmission coil 11 and the outer peripheral edge of the lower surface 23 of the power receiving coil 21 over the whole periphery. The region identifying unit 34 identifies the calculated coil-to-coil region C1 as the magnetic field generation region X.

Here, when the shape and the size of the upper surface 13 of the power transmission coil 11 and the shape and the size of the lower surface 23 of the power receiving coil 21 are the same as each other, the coil-to-coil region C1 has a pillar shape. In this case, the coil-to-coil region C1 has various pillar shapes such as a cylindrical shape and a quadrangular pillar shape in accordance with the shapes of the upper surface 13 of the power transmission coil 11 and the lower surface 23 of the power receiving coil 21. In addition, when the shape of the upper surface 13 of the power transmission coil 11 and the shape of the lower surface 23 of the power receiving coil 21 are the same as each other and the size of the upper surface 13 of the power transmission coil 11 and the size of the lower surface 23 of the power receiving coil 21 are different from each other, the coil-to-coil region C1 has a frustum shape. In this case, the coil-to-coil region C1 has various frustum shapes such as a frustum of circular cone shape and a frustum of rectangle shape in accordance with the shapes of the upper surface 13 of the power transmission coil 11 and the lower surface 23 of the power receiving coil 21.

In addition, there are cases in which a magnetic field generated between the upper surface 13 of the power transmission coil 11 and the lower surface 23 of the power receiving coil 21 during power feeding is also generated outside the coil-to-coil region C1. Therefore, the region identifying unit 34 can also identify the magnetic field generation region X in consideration of swelling of the part in which this magnetic field is generated. Specifically, the region identifying unit 34 calculates a power transmission-side coil extended surface 14 (first extended coil facing surface) realized by extending the outer peripheral edge of the upper surface 13 of the power transmission coil 11 outward over the whole periphery by a predetermined extension length K. Similarly, the region identifying unit 34 calculates a power receiving-side coil extended surface 24 (second extended coil facing surface) realized by extending the outer peripheral edge of the lower surface 23 of the power receiving coil 21 outward over the whole periphery by the extension length K. The region identifying unit 34 three-dimensionally calculates an extended coil-to-coil region C2 having a pillar shape or a frustum shape formed between the power transmission-side coil extended surface 14 and the power receiving-side coil extended surface 24. The region identifying unit 34 can calculate the extended coil-to-coil region C2 in a manner similar to that of the coil-to-coil region C1.

The region identifying unit 34 identifies, as the magnetic field generation region X, a region between the height position of a surface in the power transmitter 10 facing the power receiver 20 and the height position of a surface in the power receiver 20 facing the power transmitter 10 in the calculated extended coil-to-coil region C2. Here, in the present embodiment, a surface in the power transmitter 10 facing the power receiver 20 is the upper surface 13 of the power transmission coil 11. The height position of the upper surface 13 of the power transmission coil 11 and the height position of the power transmission-side coil extended surface 14 are the same as each other. Similarly, a surface in the power receiver 20 facing the power transmitter 10 is the lower surface 23 of the power receiving coil 21. The height position of the lower surface 23 of the power receiving coil 21 and the height position of the power receiving-side coil extended surface 24 are the same as each other. Therefore, in the present embodiment, the region identifying unit 34 identifies the entirety of extended coil-to-coil region C2 as the magnetic field generation region X.

Here, a gap between the upper surface 13 of the power transmission coil 11 and the lower surface 23 of the power receiving coil 21 in the facing direction is referred to as a gap length G When the gap length G increases, the swelling amount of a part in which a magnetic field is generated also increases. Therefore, the predetermined extension length K is set to a length equivalent to or smaller than the value of the gap length G×P. Here, P is a constant determined in accordance with the type of the coil (circular type, solenoid type, and the like) and the shape of the coil (square shape, slender rectangular shape, and the like). In the present embodiment, P is often a value within a range of 0 to 1. Therefore, when the extension length K is 0 (zero), the magnetic field generation region X becomes the same as the coil-to-coil region C1. The magnetic field generation region X can be set between the coil-to-coil region C1 and the extended coil-to-coil region C2 with the extension length K set to the gap length by setting the extension length K in accordance with extension of a part in which a magnetic field is generated.

Figure 4:
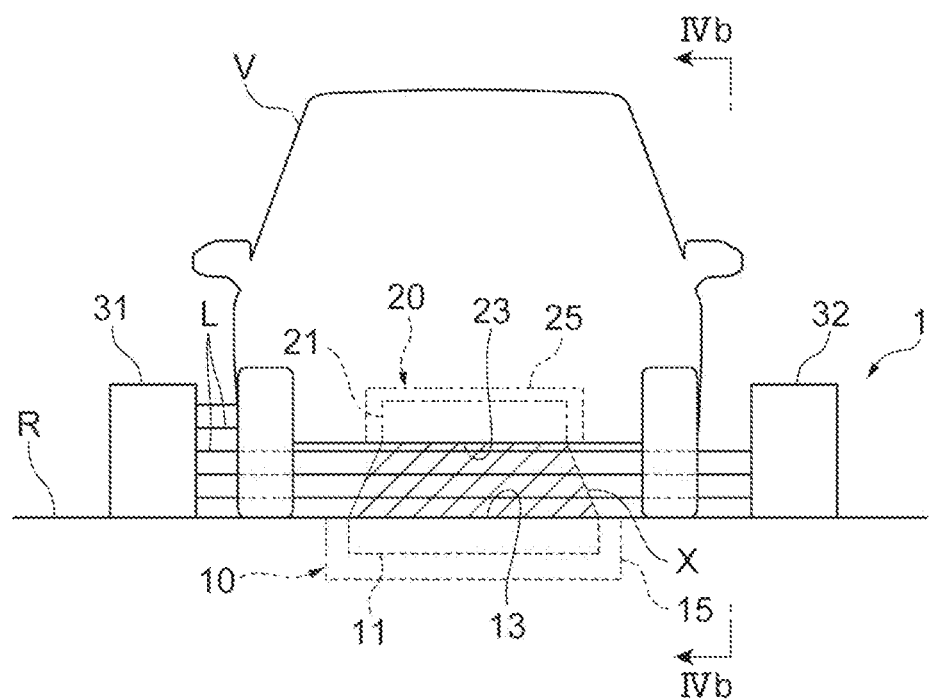
FIG. 4(a) is a view illustrating a schematic configuration of the wireless power transfer system at the time of detecting the presence or absence of a foreign object as viewed from in front of the vehicle.
FIG. 4(b) is a view illustrating a schematic configuration of the wireless power transfer system in FIG. 4(a) viewed from a side of the vehicle (schematic configuration of a cross section IVb-IVb when the light projecting unit is viewed from the light receiving unit).
Figure 4:
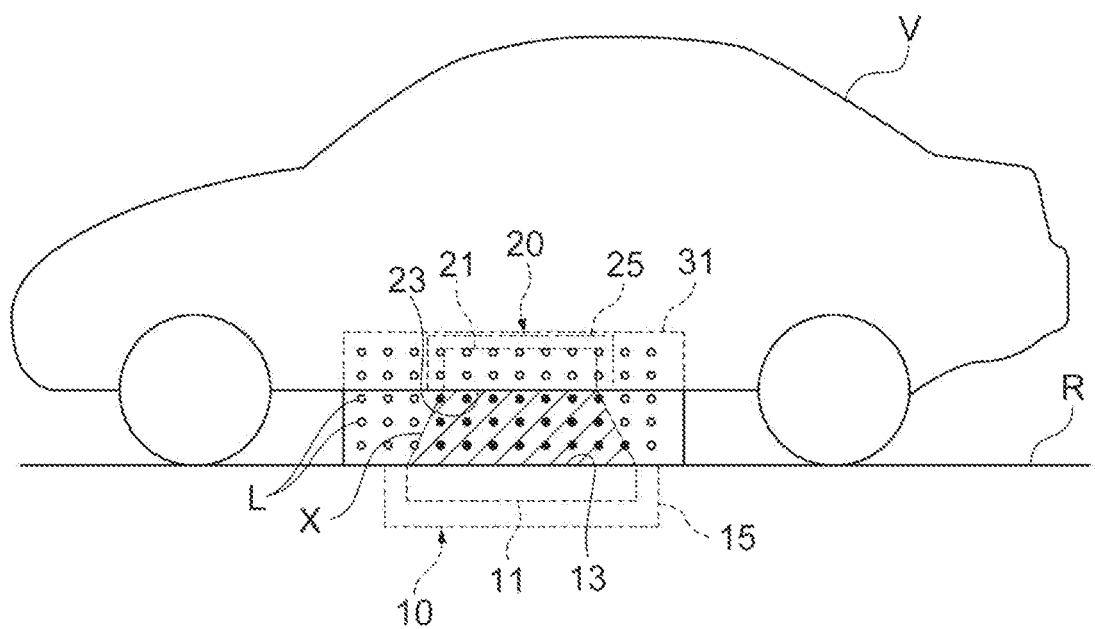
Figure 5:
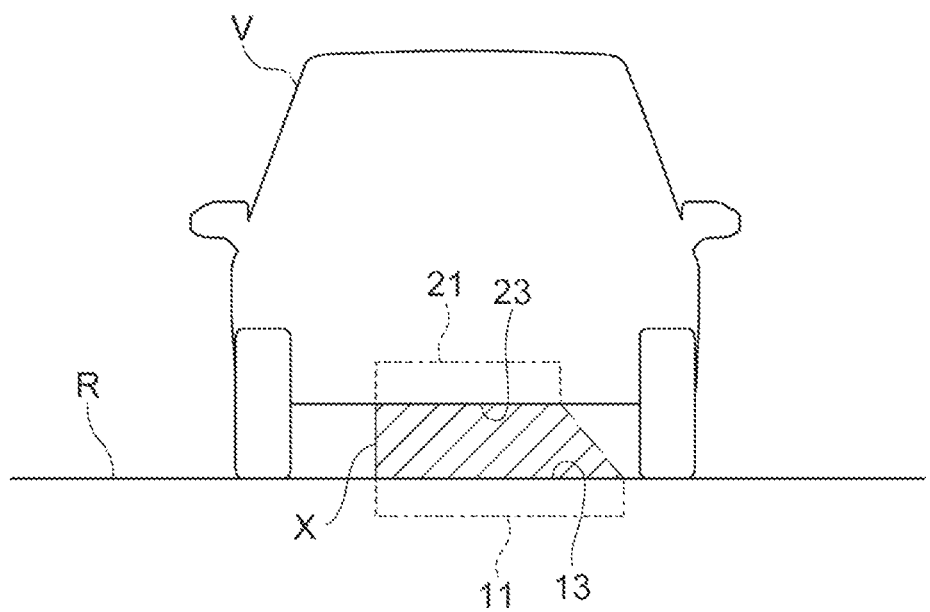
FIG. 5(a) is a schematic view of the magnetic field generation region as viewed from in front of the vehicle in a case in which the vehicle stops at a position misaligned from a power feeding position.
FIG. 5(b) is a schematic view of the magnetic field generation region viewed from a side of the vehicle in a case in which the vehicle stops at a position misaligned from the power feeding position.
Figure 5:
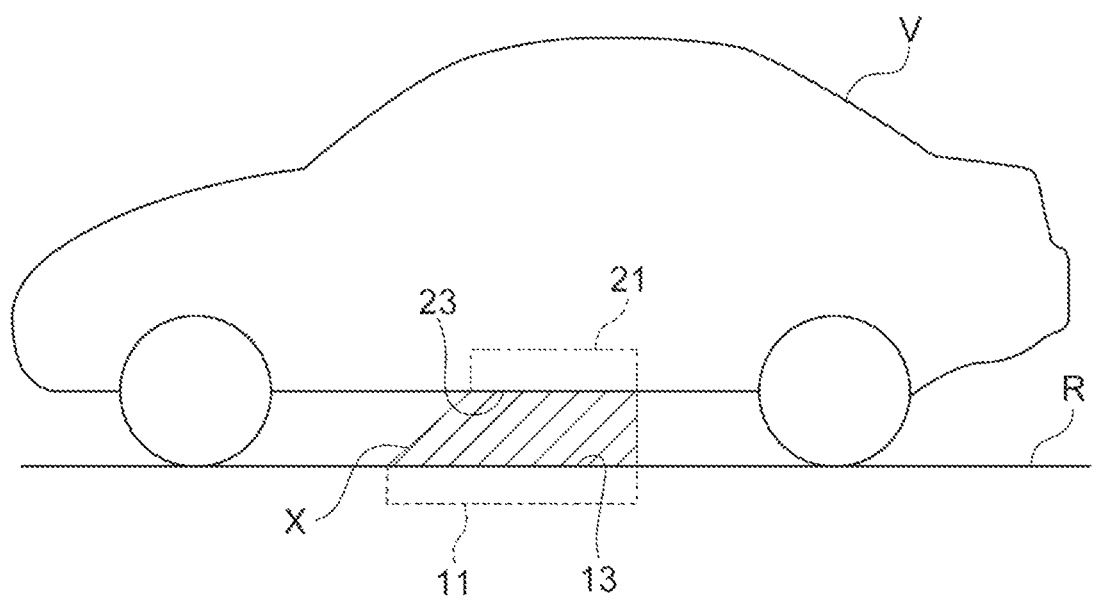

Accordingly, as illustrated in FIGS. 4(a), 4(b), 5(a), and 5(b), the region identifying unit 34 can identify the magnetic field generation region X generated between the upper surface 13 of the power transmission coil 11 and the lower surface 23 of the power receiving coil 21. FIGS. 4(a), 4(b), 5(a), and 5(b) illustrate the case in which the coil-to-coil region C1 is identified as the magnetic field generation region X. In addition, FIGS. 4(a) and 4(b) illustrate the magnetic field generation region X identified by the region identifying unit 34 when the vehicle V has stopped at the power feeding position set in advance within the power feedable region. FIGS. 5(a) and 5(b) illustrate the magnetic field generation region X identified by the region identifying unit 34 using the position of the vehicle V detected by the position detection unit 37, when the vehicle V has stopped at a position misaligned from the power feeding position within the power feedable region. In FIGS. 5(a) and 5(b), in order to illustrate the magnetic field generation region X, the light receiving unit 32 and the like are omitted.

The foreign object detection unit 33 detects the presence or absence of a foreign object within the magnetic field generation region X identified by the region identifying unit 34. In the present embodiment, the foreign object detection unit 33 detects the presence or absence of a foreign object based on detection results of the light beams L obtained by the light receiving unit 32. That is, the presence or absence of a foreign object is detected by utilizing the fact that a foreign object blocks light beams. In addition, in order to detect the presence or absence of a foreign object within the magnetic field generation region X, the foreign object detection unit 33 detects the presence or absence of a foreign object based on the detection results of the light beams L, of a plurality of light beams L detected by the light receiving unit 32, passing through the inside of the magnetic field generation region X. Using a known technology, the foreign object detection unit 33 identifies the light beams L, of a plurality of light beams L emitted from the light projecting unit 31, passing through the inside of the magnetic field generation region X identified by the region identifying unit 34.

In the example illustrated in FIGS. 4(a) and 4(b), the light beams L passing through the inside of the magnetic field generation region X are indicated with black circles, and the light beams L passing through the outside of the magnetic field generation region X are indicated with outlined circles. When any of the light beams L passing through the inside of the magnetic field generation region X is not detected by the light receiving unit 32, the foreign object detection unit 33 detects that there is a foreign object within the magnetic field generation region X. When all of the light beams L passing through the inside of the magnetic field generation region X are detected by the light receiving unit 32, the foreign object detection unit 33 detects that there is no a foreign object within the magnetic field generation region X.

For example, the light beams L passing through the outside of the magnetic field generation region X are blocked by the vehicle body of the vehicle V or does not pass through a region not affecting (less likely to affect) power feeding even if a foreign object is present when performing power feeding. Therefore, the foreign object detection unit 33 does not use the detection results of the light beams L passing through the outside of the magnetic field generation region X, to detect a foreign object.

When a foreign object is detected by the foreign object detection unit 33, the power transmission circuit 12 stops supplying AC power to the power transmission coil 11. Accordingly, when a foreign object is present within the magnetic field generation region X, power feeding between the power transmitter 10 and the power receiver 20 stops, or power feeding does not start.

The present embodiment is constituted as described above. In the foreign object detection device 30 of the wireless power transfer system 1, the magnetic field generation region X is identified based on the power transmitter information stored in the storage unit 35 and the power receiver information acquired by the information acquiring unit 36. In the foreign object detection device 30, the foreign object detection unit 33 detects the presence or absence of a foreign object within the magnetic field generation region X. Accordingly, even if the shape or the like of the lower surface 23 of the power receiving coil 21 varies according to the vehicle V, the magnetic field generation region X can be correctly identified in accordance with the vehicle V. Accordingly, in the foreign object detection device 30, detection of a foreign object, of foreign objects between the power transmitter 10 and the power receiver 20, not hindering wireless power transfer is prevented as far as possible, and a likelihood that wireless power transfer will be stopped can be reduced.

The region identifying unit 34 can identify, as a magnetic field generation region, the coil-to-coil region C1 having a pillar shape or a frustum shape formed between the upper surface 13 of the power transmission coil 11 and the lower surface 23 of the power receiving coil 21. In this case, the foreign object detection device 30 can easily identify, as the magnetic field generation region X, a region significantly affecting power feeding when a foreign object is present.

The region identifying unit 34 can identify, as the magnetic field generation region X, the extended coil-to-coil region C2 having a pillar shape or a frustum shape formed between the power transmission-side coil extended surface 14 realized by extending the upper surface 13 of the power transmission coil 11 and the power receiving-side coil extended surface 24 realized by extending the lower surface 23 of the power receiving coil 21. In this case, even when a part in which a magnetic field is generated between the power transmission coil 11 and the power receiving coil 21 swells outward, the foreign object detection device 30 can easily identify, as the magnetic field generation region X, a region including the part which swells outward and in which a magnetic field is generated.

The region identifying unit 34 identifies the magnetic field generation region X based on the position of the vehicle V detected by the position detection unit 37, in addition to the power transmitter information and the power receiver information. Accordingly, for example, even if the stop position of the vehicle V is misaligned from the power feeding position set in advance, the foreign object detection device 30 can accurately identify the magnetic field generation region X in consideration of this misalignment as well.

Next, as a modification example, a method of identifying the magnetic field generation region X in the case of using a power transmitter and a power receiver having a configuration different from those, in place of the power transmitter 10 and the power receiver 20, will be described. As a power transmitter having a configuration different from the power transmitter 10, for example, FIGS. 6(a) and 6(b) illustrate a power transmitter 10A. The power transmitter 10A includes the power transmission coil 11 and the like, similar to the foregoing embodiment. In the power transmitter 10A, the power transmission coil 11 is accommodated inside the cover 15 and is not exposed to the upper surface of the cover 15. That is, the upper surface of the power transmission coil 11 is covered with the cover 15. In the example illustrated in FIGS. 6(a) and 6(b), the power transmitter 10A is installed on the traveling road surface R. The height position of an upper surface 16 of the power transmitter 10A is higher than the height position of the traveling road surface R.

As a power receiver having a configuration different from the power receiver 20, for example, FIGS. 7(a) and 7(b) illustrate a power receiver 20A. The power receiver 20A includes the power receiving coil 21 and the like, similar to the foregoing embodiment. In the power receiver 20A, the power receiving coil 21 is accommodated inside the cover 25 and is not exposed to the lower surface of the cover 25. That is, the lower surface of the power receiving coil 21 is covered with the cover 25.

Hereinafter, a method of identifying the magnetic field generation region X in the case in which the power transmission coil 11 and the power receiving coil 21 are respectively covered with the cover 15 and the cover 25, as in the power transmitter 10A and the power receiver 20A, will be described by using FIG. 8.

In the case of using the power transmitter 10A, the storage unit 35 stores the power transmitter information (first coil device information) including the shape of the upper surface 13 of the power transmission coil 11, the size of the upper surface 13, the height position of the upper surface 13 from the traveling road surface R, and the height position of a surface in the power transmitter 10A (first device facing surface) facing the power receiver 20A from the traveling road surface R. In the case of using the power transmitter 10A, a surface in the power transmitter 10A facing the power receiver 20A is the upper surface 16 of the cover 15. Therefore, the storage unit 35 stores the shape of the upper surface 13 of the power transmission coil 11, the size of the upper surface 13, the height position of the upper surface 13 from the traveling road surface R, and the height position of the upper surface 16 of the cover 15 from the traveling road surface R.

In the case of using the power receiver 20A, the information acquiring unit 36 acquires the power receiver information (second coil device information) including the shape of the lower surface 23 of the power receiving coil 21, the size of the lower surface 23, the height position of the lower surface 23 from the traveling road surface R, and the height position of a surface in the power receiver 20A (second device facing surface) facing the power transmitter 10A from the traveling road surface R. In the case of using the power receiver 20A, a surface in the power receiver 20A facing the power transmitter 10A is a lower surface 26 of the cover 25. Therefore, the information acquiring unit 36 acquires the power receiver information including the shape of the lower surface 23 of the power receiving coil 21, the size of the lower surface 23, the height position of the lower surface 23 from the traveling road surface R, and the height position of the lower surface 26 of the cover 25 from the traveling road surface R.

The region identifying unit 34 identifies the magnetic field generation region X generated between the upper surface 16 of the cover 15 of the power transmitter 10A and the lower surface 26 of the cover 25 of the power receiver 20A during power feeding, based on the power transmitter information stored in the storage unit 35 and the power receiver information acquired by the information acquiring unit 36. The region identifying unit 34 can identify the magnetic field generation region X by performing a known simulation in consideration of the power transmitter information, the power receiver information, and the characteristics or the like of the power transmission coil 11 and the power receiving coil 21.

In addition, the region identifying unit 34 may identify the magnetic field generation region X generated between the power transmitter 10A and the power receiver 20A, by performing approximation or the like thereof. The region identifying unit 34 can three-dimensionally grasp a positional relationship between the upper surface 13 of the power transmission coil 11, the lower surface 23 of the power receiving coil 21, the upper surface 16 of the cover 15, and the lower surface 26 of the cover 25 based on the power transmitter information and the power receiver information. More specifically, the region identifying unit 34 can three-dimensionally grasp the positions of the lower surface 23 of the power receiving coil 21 and the lower surface 26 of the cover 25 with respect to the upper surface 13 of the power transmission coil 11 and the upper surface 16 of the cover 15 based on the position of the vehicle V detected by the position detection unit 37, the power transmitter information, and the power receiver information.

The region identifying unit 34 does not have to use the position of the vehicle V detected by the position detection unit 37. In this case, on the assumption that the vehicle V has stopped at the power feeding position set in advance within the power feedable region, the region identifying unit 34 can three-dimensionally grasp the positions of the lower surface 23 of the power receiving coil 21 and the lower surface 26 of the cover 25 with respect to the upper surface 13 of the power transmission coil 11 and the upper surface 16 of the cover 15 based on the power transmitter information and the power receiver information.

Similar to the embodiment, the region identifying unit 34 three-dimensionally calculates the coil-to-coil region C1 formed between the upper surface 13 of the power transmission coil 11 and the lower surface 23 of the power receiving coil 21. The region identifying unit 34 identifies, as the magnetic field generation region X, a region between the upper surface 16 of the cover 15 and the lower surface 26 of the cover 25 in the coil-to-coil region C1.

In addition, there are cases in which a magnetic field generated between the upper surface 13 of the power transmission coil 11 and the lower surface 23 of the power receiving coil 21 during power feeding is also generated outside the coil-to-coil region C1. Therefore, the region identifying unit 34 can also identify the magnetic field generation region X in consideration of swelling of the part in which this magnetic field is generated. Specifically, similar to the foregoing embodiment, the region identifying unit 34 three-dimensionally calculates the extended coil-to-coil region C2 formed between the power transmission-side coil extended surface 14 and the power receiving-side coil extended surface 24.

The region identifying unit 34 identifies, as the magnetic field generation region X, a region between the height position of a surface in the power transmitter 10A facing the power receiver 20A and the height position of a surface in the power receiver 20A facing the power transmitter 10A in the calculated extended coil-to-coil region C2. Here, in the present embodiment, a surface in the power transmitter 10A facing the power receiver 20A is the upper surface 16 of the cover 15. Similarly, a surface in the power receiver 20A facing the power transmitter 10A is a lower surface 26 of the cover 25. Therefore, in the present embodiment, the region identifying unit 34 identifies, as the magnetic field generation region X, a region between the height position of the upper surface 16 of the cover 15 and the height position of the lower surface 26 of the cover 25 in the extended coil-to-coil region C2.

In the case of using the power transmitter 10A and the power receiver 20A, no foreign object invades the inside of the cover 15 and the inside of the cover 25. Therefore, the inside of the cover 15 (including the cover 15 itself) and the inside of the cover 25 (including the cover 25 itself) can be excluded from a target for detecting a foreign object. When the magnetic field generation region X is identified by the method described above, the region identifying unit 34 can accurately identify the magnetic field generation region X generated between the power transmitter 10A and the power receiver 20A, excluding the inside of the cover 15 and the inside of the cover 25. Since the inside of the cover 15 and the inside of the cover 25 are excluded from the magnetic field generation region X, the cover 15 and the cover 25 can be prevented from being detected as a foreign object when the foreign object detection unit 33 detects a foreign object.

Figure 9:
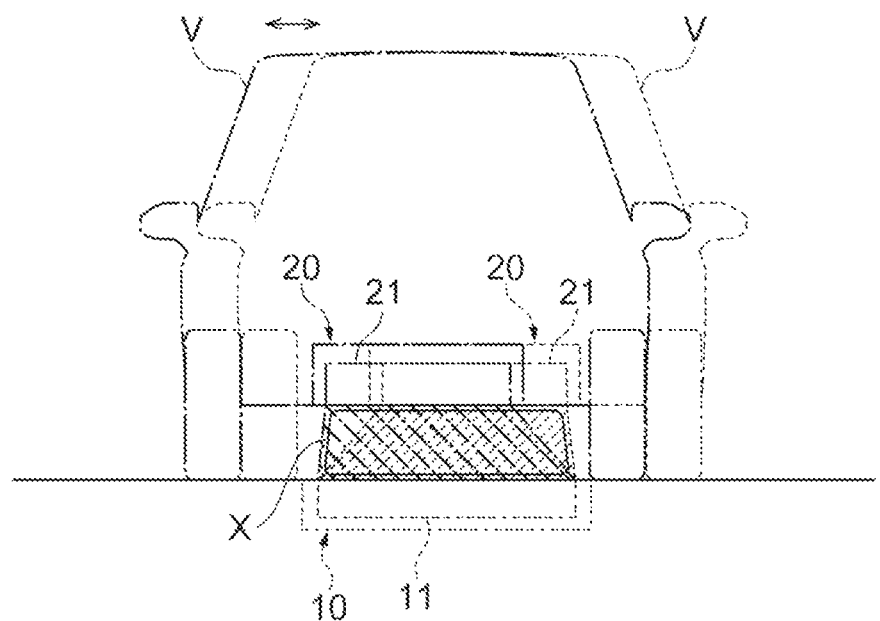
FIG. 9(a) is a schematic view of the magnetic field generation region, which is identified in consideration of a positional misalignment of the vehicle, as viewed from in front of the vehicle.
FIG. 9(b) is a schematic view of the magnetic field generation region, which is identified in consideration of a positional misalignment of the vehicle, viewed from a side of the vehicle.
Figure 9:
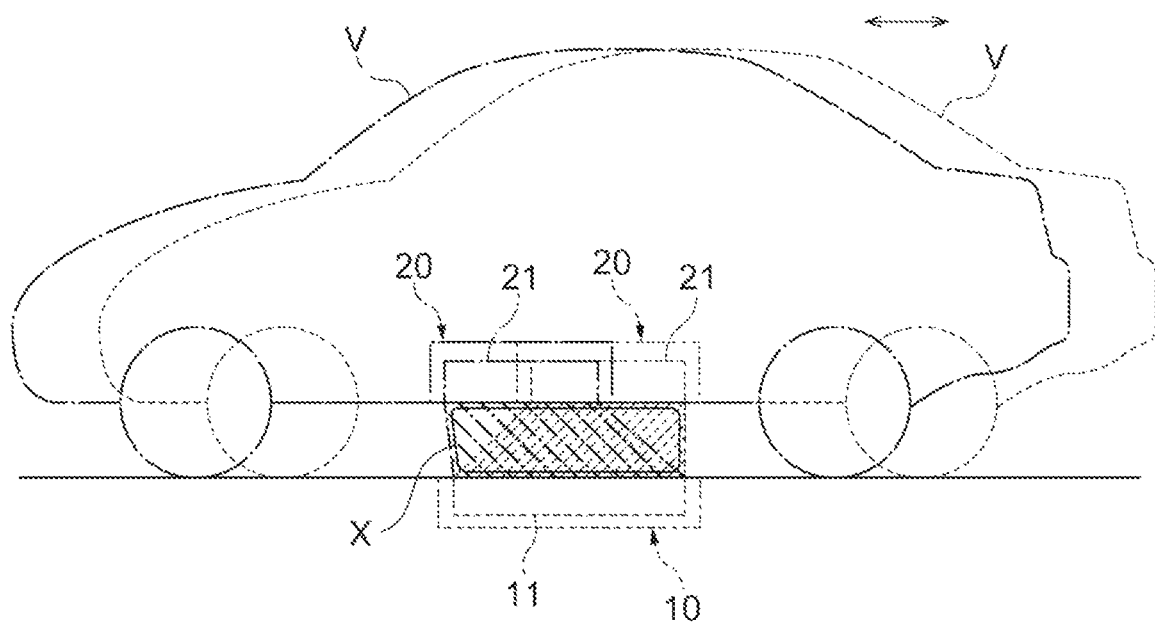

Hereinabove, the embodiment of the present disclosure and the modification example have been described. However, the present disclosure is not limited to the foregoing embodiment. For example, in the foregoing example, the region identifying unit 34 grasps the position of the lower surface 23 of the power receiving coil 21 with respect to the upper surface 13 of the power transmission coil 11 and identifies the magnetic field generation region X by using the position of the vehicle V detected by the position detection unit 37 or the power feeding position set in advance. In contrast, the region identifying unit 34 may identify the magnetic field generation region X which does not depend on a place where the vehicle V stops within the power feedable region without using the position of the vehicle V detected by the position detection unit 37 or the power feeding position set in advance. In this case, for example, as illustrated in FIGS. 9(*a*) and 9(*b*), the region identifying unit 34 may identify the magnetic field generation region X in consideration of the maximum positional misalignment within the power feedable region. That is, the region identifying unit 34 may identify the magnetic field generation region when it is assumed that the vehicle V has stopped at an arbitrary position within the power feedable region and may identify the magnetic field generation region X such that all of the identified magnetic field generation regions are included. In this case, the position detection unit 37 may be omitted.

In FIG. 9(*a*), the vehicle V, the magnetic field generation region generated between the power transmission coil 11 and the power receiving coil 21, and the like indicated with the one dot chain line illustrate a state when being maximally misaligned to one end portion side in the width direction of the vehicle V within the power feedable region. The vehicle, the magnetic field generation region generated between the power transmission coil 11 and the power receiving coil 21, and the like indicated with the dotted line illustrate a state when being maximally misaligned to the other end portion side in the width direction of the vehicle V within the power feedable region. Similarly, in FIG. 9(*b*), the vehicle V, the magnetic field generation region generated between the power transmission coil 11 and the power receiving coil 21, and the like indicated with the one dot chain line illustrate a state when being maximally misaligned to one end portion side in the front-rear direction of the vehicle V within the power feedable region. The vehicle, the magnetic field generation region generated between the power transmission coil 11 and the power receiving coil 21, and the like indicated with the dotted line illustrate a state when being maximally misaligned to the other end portion side in the front-rear direction of the vehicle V within the power feedable region. The region identifying unit 34 identifies, as the magnetic field generation region X, a region including all of these magnetic field generation regions indicated with the one dot chain lines and the dotted lines.

Figure 6:
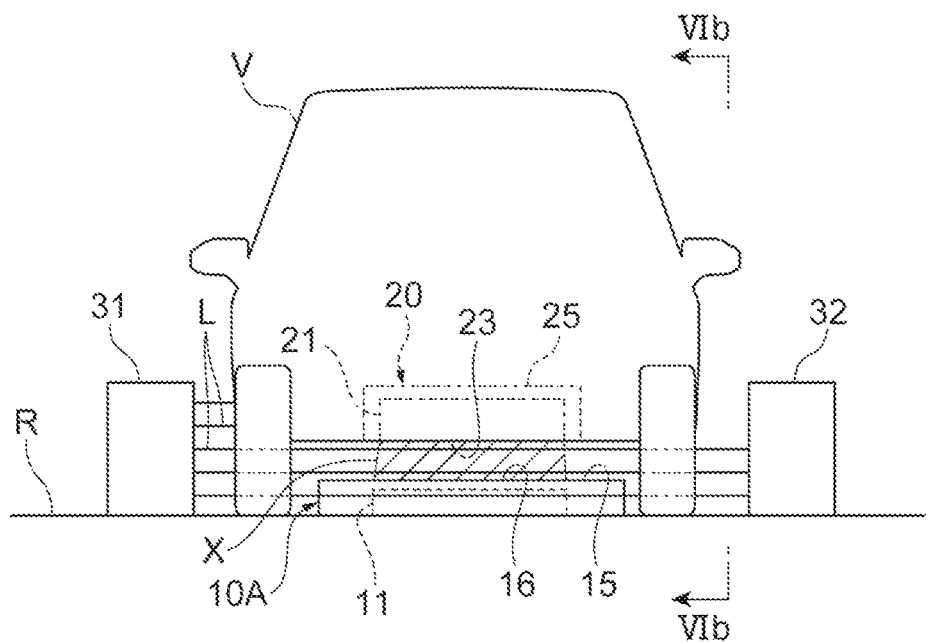
FIG. 6(a) is a view illustrating a schematic configuration of a wireless power transfer system according to a modification example as viewed from in front of the vehicle.
FIG. 6(b) is a view illustrating a schematic configuration of the wireless power transfer system in FIG. 6(a) viewed from a side of the vehicle (schematic configuration of a cross section VIb-VIb when the light projecting unit is viewed from the light receiving unit).
Figure 6:
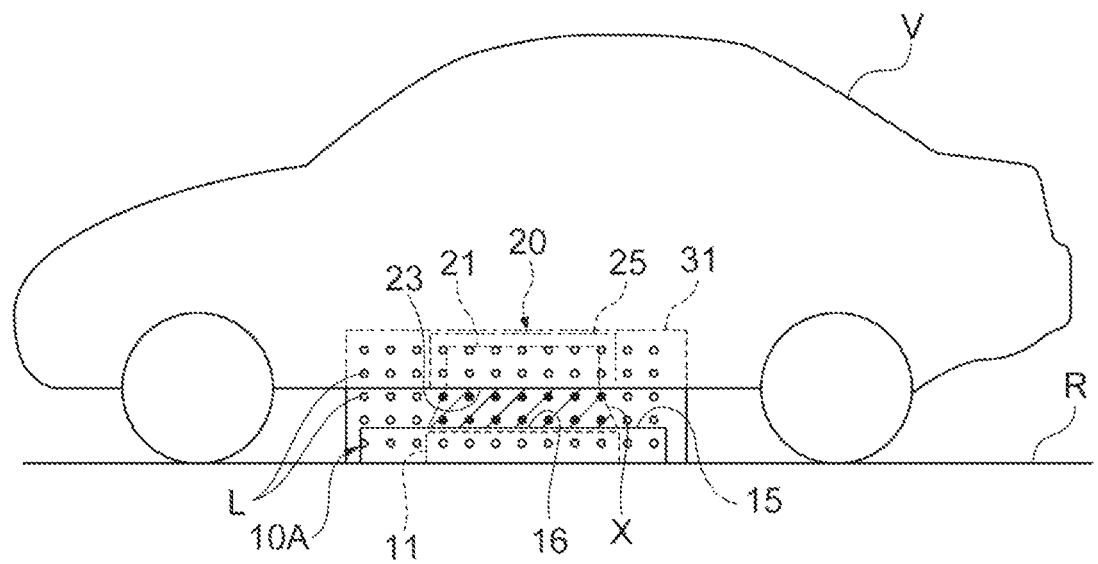
Figure 7:
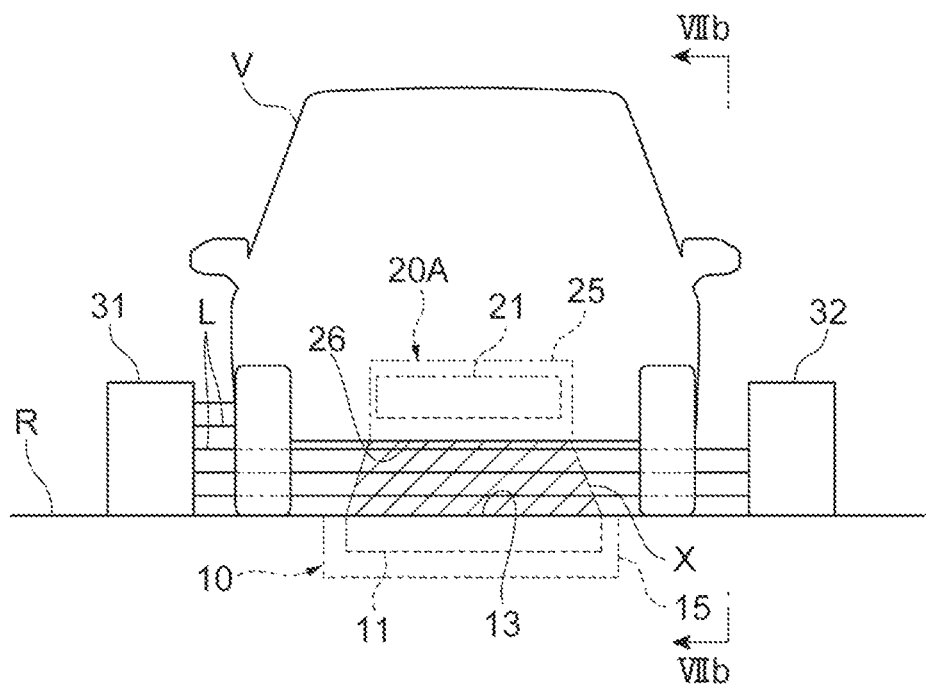
FIG. 7(a) is a view illustrating a schematic configuration of a wireless power transfer system according to another modification example as viewed from in front of the vehicle.
FIG. 7(b) is a view illustrating a schematic configuration of the wireless power transfer system in FIG. 7(a) viewed from a side of the vehicle (schematic configuration of a cross section VIIb-VIIb when the light projecting unit is viewed from the light receiving unit).
Figure 7:
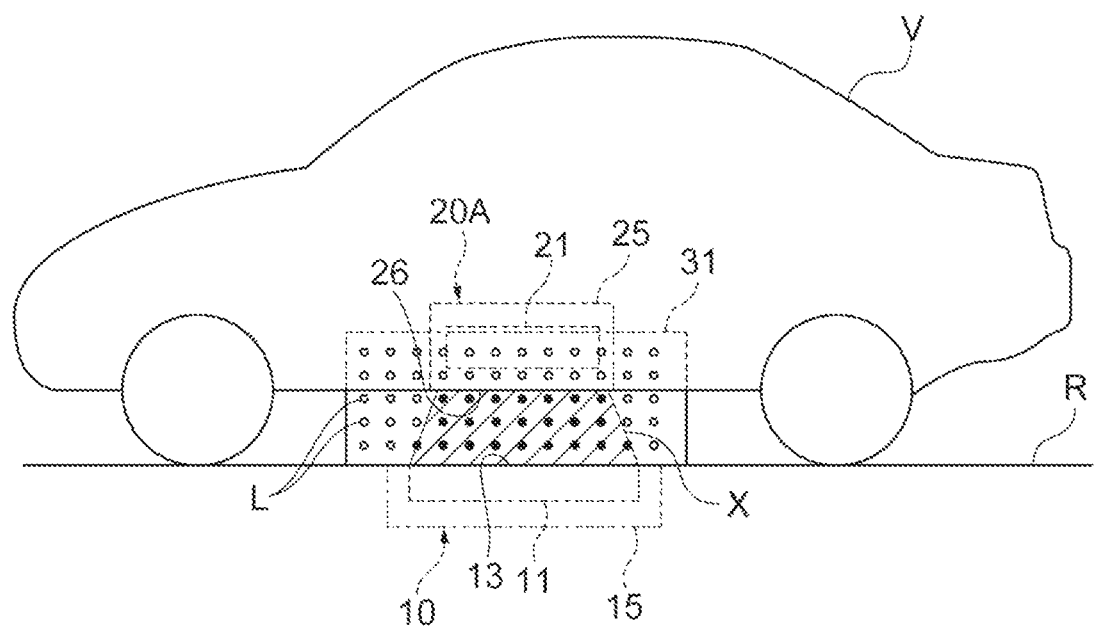
Figure 8:
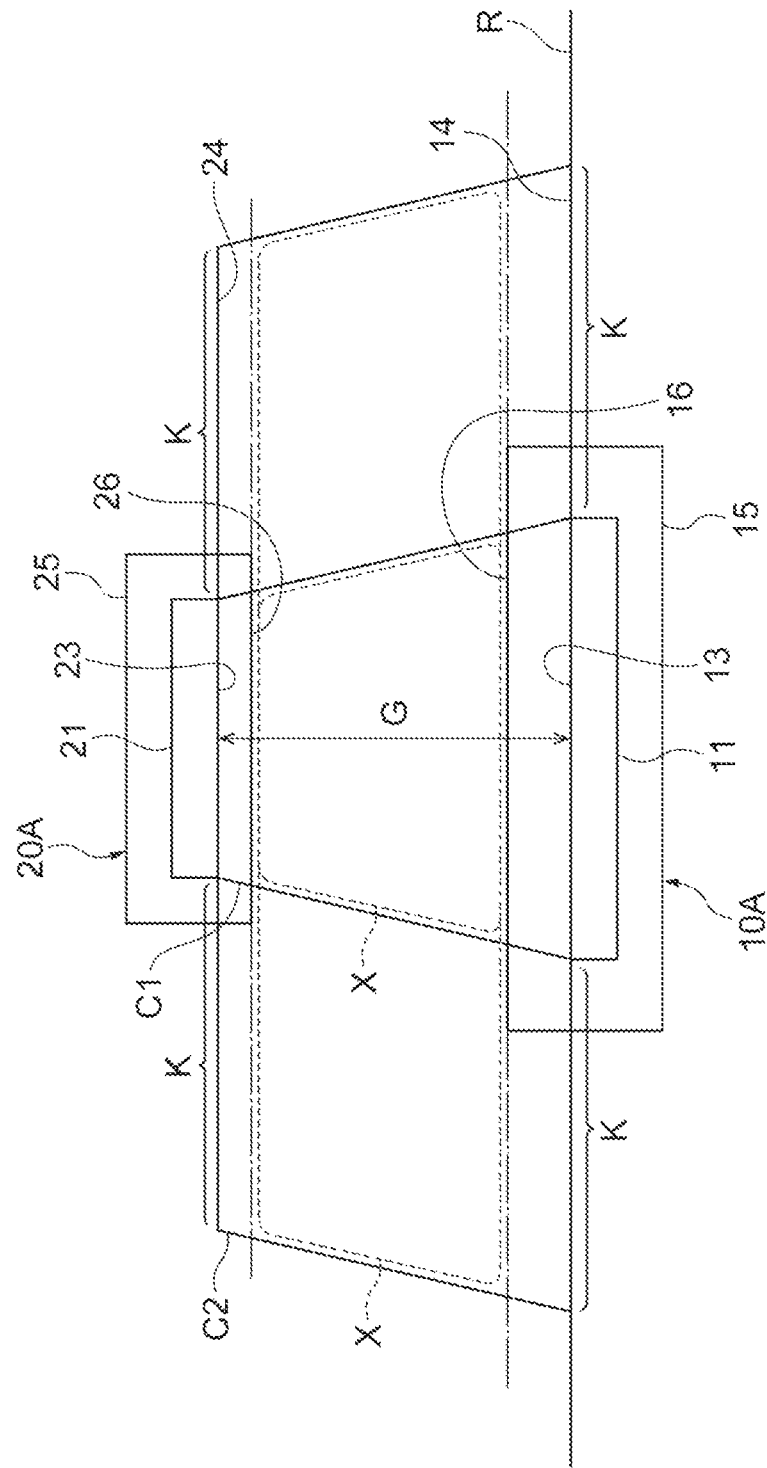
FIG. 8 is a schematic view for describing a magnetic field generation region which is a target for detecting the presence or absence of a foreign object in the modification example.

In addition, regarding the power transmitter and the power receiver, both thereof do not have to be the power transmitter 10A and the power receiver 20A in which the coil is covered with a cover as illustrated in FIG. 8. As illustrated in FIGS. 6 and 7, either one of the power transmitter or the power receiver may be the power transmitter 10A or the power receiver 20A in which the coil is covered with a cover. In this case as well (case as illustrated in FIGS. 6 and 7), similar to that described by using FIGS. 3 and 8, the region identifying unit 34 can identify the magnetic field generation region X.

The foreign object detection unit 33 detects the presence or absence of a foreign object within the magnetic field generation region X based on detection results of the light beams L obtained by the light receiving unit 32. However, the foreign object detection unit 33 may detect the presence or absence of a foreign object based on information other than the detection results of the light receiving unit 32. For example, the foreign object detection unit 33 may detect the presence or absence of a foreign object within the magnetic field generation region X by performing known image processing with respect to an image captured by an image capturing device such as a stereo camera. In addition, the foreign object detection unit 33 may emit a laser and may detect the presence or absence of a foreign object within the magnetic field generation region X based on detection results of the laser reflected by a foreign object.

The power transmission coil 11 and the power receiving coil 21 are circular coils, for example. A circular coil includes a spirally wound conductive wire when seen in the facing direction of the power transmission coil 11 and the power receiving coil 21. This conductive wire is wound in a rectangular shape or a circular shape, for example. Alternatively, the power transmission coil 11 and the power receiving coil 21 may be solenoid coils.

In the foregoing example, power is transmitted from the power transmitter 10 installed on the traveling road surface R (ground) to the vehicle V side. However, power may be transmitted from the vehicle V to the traveling road surface R side (ground side).

In addition, in the foregoing example, power is fed from the ground side to the vehicle V. However, power can also be fed to movable objects other than the vehicle V. Examples of movable objects include watercrafts. For example, in a case in which power is fed to a watercraft, an attachment surface of a power transmission coil of a power transmitter provided in a harbor or the like can serve as a reference surface. In addition, the height position or the like of a surface on the power transmitter side in a power transmission coil of a power receiver mounted in the watercraft can serve as a height position from the reference surface at the power feeding position. For example, in a case in which power is fed to a watercraft from a side, a vertical surface serves as a reference surface, and the distance from the reference surface in the horizontal direction is used, instead of the height position. In addition, movable objects are not limited to the vehicles V and watercrafts. Examples thereof may include motorcycles, bicycles, electric trains, and aircrafts.

The power receiver 20 may be attached to the bottom surface of the vehicle body of the vehicle V, in front of the front wheels of the vehicle V or behind the rear wheels of the vehicle V. The power transmission circuit 12 may be accommodated in a separated casing, instead of being accommodated inside the cover 15.

INDUSTRIAL APPLICABILITY

According to a foreign object detection device for a wireless power transfer system of the present disclosure, detection of a foreign object, of foreign objects between coil devices, not hindering wireless power transfer is prevented as far as possible, and a likelihood that wireless power transfer will be stopped can be reduced.

REFERENCE SIGNS LIST

1 Wireless power transfer system
10 Power transmitter (first coil device)
11 Power transmission coil (first coil)
13 Upper surface of power transmission coil (first coil facing surface and first device facing surface)
14 Power transmission-side coil extended surface (first extended coil facing surface)
16 Upper surface of cover (first device facing surface)
20 Power receiver (second coil device)
21 Power receiving coil (second coil)
23 Lower surface of power receiving coil (second coil facing surface and second device facing surface)
24 Power receiving-side coil extended surface (second extended coil facing surface)
26 Lower surface of cover (second device facing surface)
30 Foreign object detection device
33 Foreign object detection unit
34 Region identifying unit
35 Storage unit
36 Information acquiring unit
37 Position detection unit
C1 Coil-to-coil region
C2 Extended coil-to-coil region
R Traveling road surface (reference surface)
V Vehicle (movable object)
X Magnetic field generation region

The invention claimed is:

1. A foreign object detection device for a wireless power transfer system wirelessly feeding power between a first coil device which has a first coil and is installed on a reference surface and a second coil device which has a second coil and is mounted in a movable object, the foreign object detection device comprising:
a storage unit that stores first coil device information including a shape of a first coil facing surface in the first coil facing the second coil device, a size of the first coil facing surface, a height position of the first coil facing surface from the reference surface, and a height position of a first device facing surface in the first coil device facing the second coil device from the reference surface;
an information acquiring unit that acquires second coil device information including a shape of a second coil facing surface in the second coil facing the first coil device, a size of the second coil facing surface, a height position of the second coil facing surface from the reference surface, and a height position of a second device facing surface in the second coil device facing the first coil device from the reference surface;

a region identifying unit that identifies a magnetic field generation region generated between the first device facing surface and the second device facing surface when feeding power, based on the first coil device information and the second coil device information; and a foreign object detection unit that detects the presence or absence of a foreign object within the identified magnetic field generation region, and wherein the region identifying unit identifies, as the magnetic field generation region, a region between the first device facing surface and the second device facing surface in a coil-to-coil region having a pillar shape or a frustum shape formed between the first coil facing surface and the second coil facing surface.

2. A foreign object detection device for a wireless power transfer system wirelessly feeding power between a first coil device which has a first coil and is installed on a reference surface and a second coil device which has a second coil and is mounted in a movable object, the foreign object detection device comprising:

a storage unit that stores first coil device information including a shape of a first coil facing surface in the first coil facing the second coil device, a size of the first coil facing surface, a height position of the first coil facing surface from the reference surface, and a height position of a first device facing surface in the first coil device facing the second coil device from the reference surface;

an information acquiring unit that acquires second coil device information including a shape of a second coil facing surface in the second coil facing the first coil device, a size of the second coil facing surface, a height position of the second coil facing surface from the reference surface, and a height position of a second device facing surface in the second coil device facing the first coil device from the reference surface;

a region identifying unit that identifies a magnetic field generation region generated between the first device facing surface and the second device facing surface when feeding power, based on the first coil device information and the second coil device information; and a foreign object detection unit that detects the presence or absence of a foreign object within the identified magnetic field generation region wherein the region identifying unit identifies, as the magnetic field generation region, a region between the height position of the first device facing surface and the height position of the second device facing surface in an extended coil-to-coil region having a pillar shape or a frustum shape formed between a first extended coil facing surface which is realized by extending an outer peripheral edge of the first coil facing surface outward over a whole periphery by a predetermined extension length and a second extended coil facing surface which is realized by extending an outer peripheral edge of the second coil facing surface outward over a whole periphery by the extension length, and wherein the extension length is a length equivalent to or smaller than a gap between the first coil facing surface and the second coil facing surface in a facing direction.

3. The foreign object detection device for a wireless power transfer system according to claim 1, further comprising:

a position detection unit that detects a position of the movable object in a first direction orthogonal to a facing direction of the first coil device and the second coil device, wherein the region identifying unit identifies the magnetic field generation region based on the first coil device information, the second coil device information, and a position of the movable object detected by the position detection unit.

4. The foreign object detection device for a wireless power transfer system according to claim 2, further comprising:

a position detection unit that detects a position of the movable object in a first direction orthogonal to a facing direction of the first coil device and the second coil device, wherein the region identifying unit identifies the magnetic field generation region based on the first coil device information, the second coil device information, and a position of the movable object detected by the position detection unit.

* * * * *